United States Patent
Santina

(10) Patent No.: US 9,272,934 B2
(45) Date of Patent: Mar. 1, 2016

(54) REMOVAL OF SELENIUM FROM COAL MINING RUNOFF WATER

(71) Applicant: Peter F. Santina, Lincoln, CA (US)

(72) Inventor: Peter F. Santina, Lincoln, CA (US)

(*) Notice: Subject to any disclaimer, the term of this patent is extended or adjusted under 35 U.S.C. 154(b) by 87 days.

(21) Appl. No.: 14/170,472

(22) Filed: Jan. 31, 2014

(65) Prior Publication Data

US 2015/0122736 A1 May 7, 2015

Related U.S. Application Data

(63) Continuation-in-part of application No. 13/555,620, filed on Jul. 23, 2012.

(60) Provisional application No. 61/759,039, filed on Jan. 31, 2013.

(51) Int. Cl.
| | |
|---|---|
| C02F 9/00 | (2006.01) |
| C02F 1/00 | (2006.01) |
| C02F 1/28 | (2006.01) |
| C02F 1/52 | (2006.01) |
| C02F 1/66 | (2006.01) |
| C02F 1/74 | (2006.01) |
| C02F 1/76 | (2006.01) |
| C02F 101/10 | (2006.01) |
| C02F 103/00 | (2006.01) |
| C02F 103/10 | (2006.01) |

(52) U.S. Cl.
CPC . *C02F 9/00* (2013.01); *C02F 1/004* (2013.01); *C02F 1/001* (2013.01); *C02F 1/008* (2013.01); *C02F 1/281* (2013.01); *C02F 1/283* (2013.01); *C02F 1/5245* (2013.01); *C02F 1/66* (2013.01); *C02F 1/74* (2013.01); *C02F 1/76* (2013.01); *C02F 2101/106* (2013.01); *C02F 2103/001* (2013.01); *C02F 2103/10* (2013.01); *C02F 2209/001* (2013.01); *C02F 2209/06* (2013.01); *C02F 2303/24* (2013.01)

(58) Field of Classification Search
None
See application file for complete search history.

(56) References Cited

U.S. PATENT DOCUMENTS

| | | | | |
|---|---|---|---|---|
| 4,938,874 | A * | 7/1990 | Auchincloss | 210/662 |
| 5,200,082 | A * | 4/1993 | Olsen et al. | 210/667 |
| 2011/0132839 | A1 * | 6/2011 | Zuback et al. | 210/638 |

* cited by examiner

*Primary Examiner* — Chester Barry
(74) *Attorney, Agent, or Firm* — Thomas M. Freiburger

(57) ABSTRACT

Overburden from surface coal mining in many regions can produce a rain runoff laden with selenium, in the selenate form. This occurs from exposed selenium-containing rocks in the overburden, from which selenate is leached out by the nearly-pure rainwater. The selenium-containing runoff water is caught in ponds. Remediation of the pond water to remove selenate down to permissible levels for discharge to lakes and streams is performed by treatment with sulfur-modified iron (SMI) in a contact bed of an upflow reactor vessel. After a prefiltering step, the pond water is pH-adjusted as needed and pumped through the SMI reactor. The treated water can then be run through an oxidation tank and filtered to remove iron. For extending effectiveness and life of the SMI the contact bed is periodically "fluffed" with a high-velocity upflow of water through the bed, expanding and loosening the contact bed to prevent or break up compacting of the SMI medium.

22 Claims, 5 Drawing Sheets

REMOVAL OF SELENIUM FROM COAL MINING RUNOFF WATER

This application claims benefit of provisional application Ser. No. 61/759,039, filed Jan. 31, 2013, and is a continuation-in-part of application Ser. No. 13/555,620, filed Jul. 23, 2012.

BACKGROUND OF THE INVENTION

This invention concerns remediation of surface waters by removal of toxic metals prior to discharge of the waters to streams and lakes. In particular the invention concerns overburden from surface coal mining in certain regions where selenium-containing rock is present in the overburden, and where rainwater leaching through the rock introduces objectionable levels of selenium into the runoff water, typically in the form of selenate, these levels being too high for discharge to streams and lakes.

The subject of this invention is related to that of U.S. Pat. Nos. 4,940,549, 5,200,082, 5,575,919, 5,866,014, 6,093,328 and 6,926,878. In particular, the latter four patents, U.S. Pat. Nos. 5,575,919, 5,866,014, 6,093,328 and 6,926,878 disclose preparation of a sulfur-modified iron premix (SMI) for use in treating water to remove certain substances. This invention utilizes a sulfur-modified iron (SMI) premix similar to that produced in accordance with the above patents, in a reaction column to treat runoff water laden with selenium, in particular, selenate. All of the above patents are incorporated herein by reference.

Surface coal mining operations produce large volumes of overburden, which is removed to reach coal seams. In the United States the overburden must ultimately be replaced when the mining operation is completed or moves on, and the land is reclaimed essentially back to its original condition and topography. However, the overburden exposes a multitude of rocks to rainfall, i.e. to moving water which can leach the rocks and take on substances, including minerals, present in the rocks. Rainwater is nearly pure and is a strong leaching agent. These rocks if left undisturbed would be subject to little or no rainwater leaching. The result is that runoff from rain can carry objectionable levels of dissolved substances, leached from the exposed rock, into lakes and streams.

Particularly in the Appalachian region of the United States many surface coal mining locations have rock and soil ("rock" herein) that contains selenium, especially in the selenate form. The removal of the overburden exposes these rocks and even after reclamation, runoff from rainwater in many cases exceeds permissible levels of selenium allowed for discharge to lakes and streams. In many cases the runoff water, or much of it, has been trapped in detention "ponds" at various locations around the site of a surface mine, including after reclamation, pursuant to regulations that prohibit sediment-laden runoff water from being discharged to lakes and streams at excavation sites. However, eventually the pond water must be withdrawn or allowed to overflow, ultimately reaching lakes or streams. Although sediment is much less, dissolved minerals remain, including selenium. There has been no economically feasible method for remediation of this selenium problem, and it affects many surface mines, particular in the Appalachian region, as well as others.

SUMMARY OF THE INVENTION

In the process of the invention, the selenium-containing runoff water at a surface coal mining site is caught in detention ponds. Remediation of the pond water to remove selenate down to permissible levels for discharge to lakes and streams is performed by treatment with sulfur-modified iron (SMI) in an upflow reactor vessel. After a prefiltering step to remove suspended and colloidal solids, the pond water is pH-adjusted as needed and pumped through the SMI reactor in upward flow, for a specified detention time in the SMI. The treated water, low in selenium, can then be run through an oxidation tank and filtered to remove dissolved iron that is a residual from the SMI process. The process is run in continuous flow.

The system includes provision for "fluffing" the SMI medium periodically, to expand the bed of SMI with a rapid flow of water through the medium. Not a backflush, this fluffing opens up the spaces between SMI particles, reversing compacting that has occurred, and refreshes the active surfaces to extend the life of the bed. This can be done once or more per day, for about ten to twenty minutes, at about ten times normal (service) flow rate. Fluff flow is in the same upflow direction as normal service flow. This fluffing cycle is useful in any SMI reactor column removing metals or other substances from water, not limited to coal mine runoff.

In a second embodiment of the invention, the process is the same as described above except that powdered iron is used instead of SMI. The powdered iron is a finely divided elemental iron (zero-valent), with particle size preferably about 40-80 mesh (0.017 inch to 0.007 inch). Powdered iron will react with selenium, i.e. will adsorb selenium, but not as efficiently as will SMI. In the reactor system and process of the invention, the other steps of collecting runoff in a pond, prefiltering, adjustment of pH where necessary, and passing the water through an upflow reactor, followed by steps to remove iron oxide, and periodic fluffing of the contact bed medium, are the same as described above.

It is an object of the invention to provide a process and system which effectively and efficiently remove selenium from runoff water at a coal mining site, during mine operation and after mine site reclamation. These and other objects, advantages and features of the invention will be apparent from the following description of a preferred embodiment, considered along with the accompanying drawings.

DESCRIPTION OF PREFERRED EMBODIMENTS

Permits for surface mine operators in the U.S. require that the rainfall runoff drainage from the surface mine site be controlled so that no runoff sediment is carried down into creeks, streams or lakes. The rainwater runoff flowing into these ponds has aggressively pulled dissolved minerals out of rocks, minerals such as sulfates (e.g. sodium sulfate and magnesium sulfate) and selenium, typically in the selenate form, these minerals being highly soluble. The runoff ponds tend to concentrate the dissolved minerals even further due to evaporation from the ponds. The selenate is difficult to remove from an aqueous solution.

Figure 1:
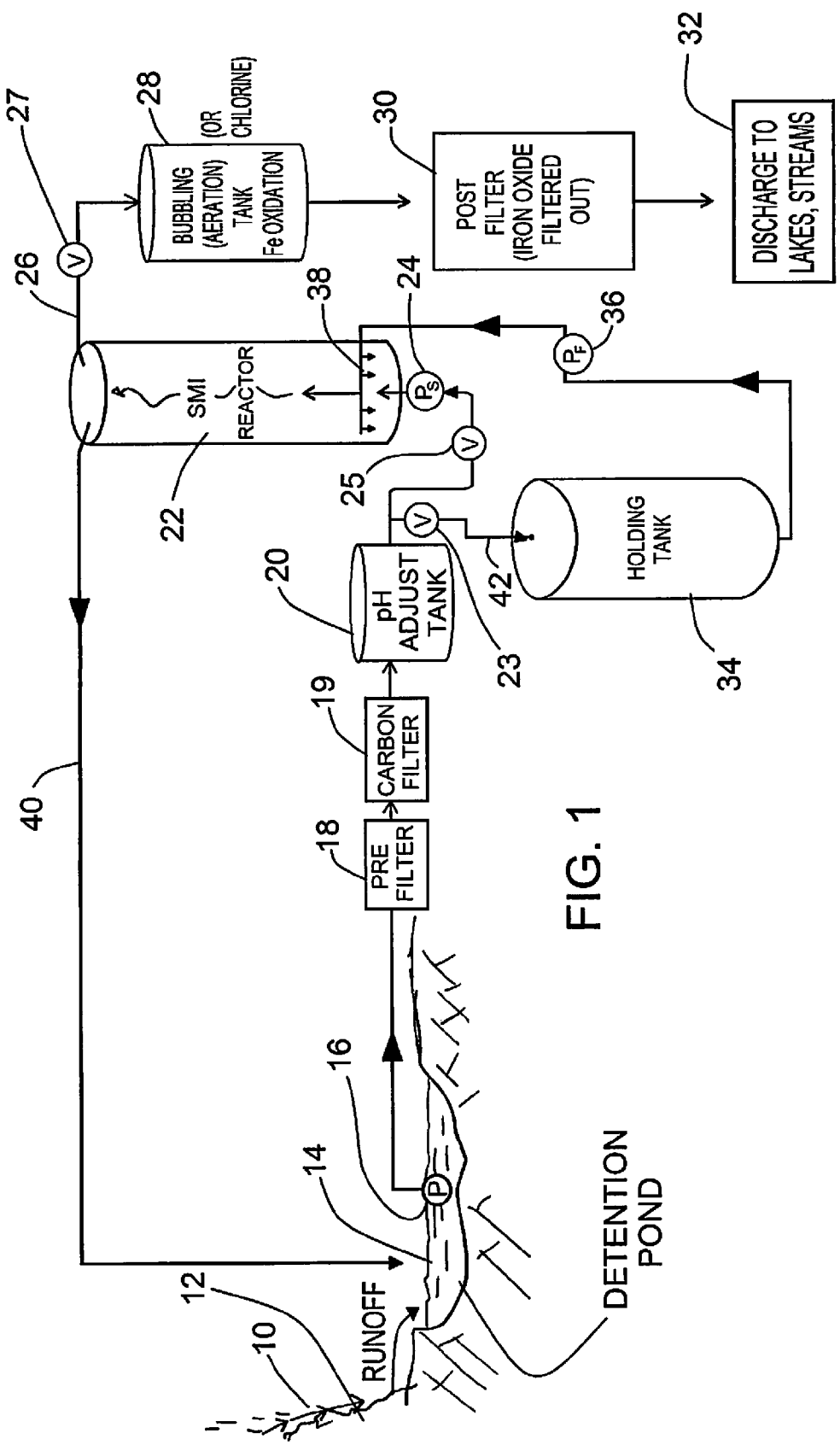
FIG. 1 is a schematic view indicating steps of the invention, including collecting runoff from surface mining coal overburden in a pond, withdrawing the pond water and processing the water through the steps of the invention.

FIG. 1 schematically shows important aspects of the invention. Runoff water emanating from rainfall is indicated at 10, flowing over and through the overburden 12 from a surface coal mining operation, sometimes called strip mining. This overburden is replaced after completion of mining at a particular location, and although the land is reclaimed, and the topography essentially restored using the overburden soil and rocks, this material has nonetheless been disturbed, and runoff rainwater, essentially pure and without dissolved minerals, will actively leach out some of the minerals from the rocks of the overburden. This occurs both during mining and after reclamation.

As noted above, one particularly deleterious mineral typically leached from rocks in certain geographical areas is selenium, usually in the form of selenate. Examples are sodium selenate, calcium selenate and magnesium selenate. The selenate ion is $SeO_4^{2-}$.

Although selenium is a mineral needed in the diet of humans in very small quantities, it has toxic effects to aquatic life at higher concentrations. Certain standards for discharge of runoff water from disturbed or reclaimed land place a limit of five parts per billion (ppb) selenium content for water that will be allowed to flow into streams and lakes. This is imposed whenever human activity is responsible for concentrating the level of selenium. In contrast, runoff water which concentrates in runoff-catching ponds at a surface mining coal site can have twenty to thirty parts per billion selenium and occasionally more.

FIG. 1 indicates one such runoff-catching pond, at 14. By the process and system of the invention, the runoff pond water 14 is remediated to remove much of the selenium content, down to below the limit of 5 ppb. As indicated, the runoff water is pumped by a pump 16 from the pond (preferably a submerged pump suspended just below the surface), and prefiltered at 18 to remove suspended and colloidal solids. This can be, e.g., a sand filter. Following this filtration the water optionally can be put through a carbon filter as indicated at 19 to remove any additional colloidal matter and any color left in the water.

The acidity of the filtered water is checked (and preferably is constantly monitored) at a tank 20, and if needed, pH is adjusted in this tank, which can be on a continuous-flow basis. An automatic system that monitors pH of the pond water and automatically adds acid for pH correction may be included in the tank or chamber 20. The preferred range of pH for treatment in the invented process is below pH 7, and preferably in the range of about 5.0 to about 7.0, more preferably about 5.5 to about 6.5, most preferably about 6.0 to about 6.5. At a pH greater than about 8, calcium can be precipitated during the treatment, which has a negative effect on treatment. In one preferred embodiment the acidity of the water exiting the adjustment tank or zone 20 is about pH 6. This usually requires addition of acid (sulfuric acid in a preferred embodiment) in the tank or zone 20, since the runoff water at a location such as the Appalachian Mountains is typically in the range of about pH 7 to 7.5. Since the chemical reactions taking place in the SMI reactor tend to increase the pH to above 8.0, the acid addition is required to avoid impairing the life of the SMI.

The prefiltered runoff water, at a pH in the desired range, proceeds to a reactor column 22, which may involve another pump 24 (after flow through a valve 25, the purpose of which will be explained below). The column 22 comprises a vertical reactor vessel through which the water is pumped to flow preferably from bottom to top as indicated; upflow assures proper and even contact with the reactant and helps keep the mass of reactant particles "open" rather than compacted. The vessel is filled with sulfur-modified iron or SMI as noted above, the SMI being chemically reactive to remove selenate and some other materials from water by adsorption, as discussed in the patents cited above, incorporated herein by reference. The depth of SMI in the reactor vessel should be limited, preferably no more than about six feet high (and preferably lower), to avoid compaction of the SMI particles. Openness is needed for best contact and treatment. In a reactor column having a diameter of about 2.0 feet and a SMI bed depth of about 40 inches, the water will take about eight minutes to flow through the SMI bed (and additional time to exit at the top of the vessel). This is a preferred dwell time for contact with the SMI, or preferably a range of about 5 to 15 minutes. The water flows out through a line 26 and a valve 27, explained below.

In a practical installation, a reactor vessel should have an inside diameter in a range of about 3 to 6 feet.

In the effluent of the reactor, indicated at the top of the reactor at 26, the treated water is low in selenium, below permissible limits, and will contain some calcium, magnesium and other minerals that may be picked up via leaching, but the water also carries some additional dissolved iron taken on from the SMI.

Iron can be removed from the treated effluent using oxidation and filtration. For example, in a tank 28, the treated water can be subjected to bubbling aeration to oxidize iron in the water, creating an iron oxide precipitate. Oxidation can also be effected by chlorination in a tank such as shown at 28. FIG. 1 shows a post-filtration step 30, in which iron oxide precipitate is filtered out of the treated water, which can be with another sand filter or another type of filter. The iron content is reduced preferably to below 0.5 parts per million. As indicated in the drawing at 32, the treated water after the sand filter can then be discharged to lakes or streams.

The entire process of the invention can be, and preferably is, carried out at atmospheric pressure (disregarding slight hydraulic pressure from pumping and in the reactor column).

As mentioned above, periodically the reactor column, i.e. the contact bed within the reactor 22, is subjected to "fluffing" to loosen and open the bed to prevent or break up compacting that has occurred, to extend the life of the medium. In FIG. 1 a separate flow circuit or fluff loop is indicated for this purpose, with the valve 23, a line 42, a holding tank 34, a fluff pump 36, fluff nozzles 38 in the tank 22, and a fluff return line 40. Fluffing of the reactor contact bed is performed preferably at least once daily, for about ten to twenty minutes. For a fluff cycle the tank 34 is pre-filled. The valve 23, which receives the prefiltered, pH-adjusted pond water, is opened to allow water to flow through the line 42 to the holding tank, which is vented to allow filling. Note that the line 42 could come from farther upstream, but preferably is as shown, so that filtered water at desired acidity is used for fluffing the SMI. When a fluff cycle is begun the pump 24 and the valves 25 and 27 are shut off and the fluff pump 36 is activated, drawing water out of the already-filled holding tank 34 and delivering the water at high velocity, approximately ten times or more service flow rate, through the fluff nozzles 38 in the tank. This rapid flow, preferably directed downwardly as it exits the nozzles 38, stirs up, fluffs, expands and fluidizes the SMI reactor bed, normally expanding the bed to twice its normal volume in the tank. With the service flow exit valve 27 closed, fluff water exits the tank at 40 and can be returned to the pond water 14. This water could be directed in a different way if desired, such as to the holding tank 34, although the water, still with high selenium, would also carry an elevated iron content from contact with the medium and thus return of the water to the runoff pond is generally preferable.

During the fluff cycle the valve 23 can remain open, slowly admitting water into the holding tank 34 while this tank is essentially drained by the fluff pump 36. The holding tank provides storage for the surge of fluff water flow that occurs during the fluff cycle. Note that the tank 34 is vented.

At the end of a fluff cycle, the valve 27 is opened, the valve 25 is opened to deliver service water flow via the pump 24, which is reactivated, and the fluff pump 36 is shut off. However, the holding tank 34 must be refilled, which can be done simultaneously with normal service flow through the reactor, and the valve 23 remains open (or is reopened if it has been closed during fluff). FIG. 1 is a simplified view, and in many instances there will be a plurality of reactors 22, e.g. ten or more, operating in parallel. The valve 25 is a schematic indication, and typically the pump 24 will provide service flow to a series of reactor vessels, e.g. ten or more, or each vessel can have its own service pump. The fluff flow is a much higher rate of flow, thus the need for the holding tank 34. The tank 34 can be open at top or otherwise vented so that it can be essentially drained during fluff. It can then be refilled at a slower rate, from the water flow downstream of the pH adjustment tank. Normally one reactor tank 22 is fluffed at a time.

Figure 3A:
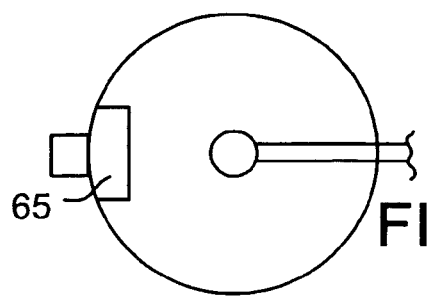
FIG. 3A is a schematic plan view showing elements of the reactor vessel.
Figure 3:
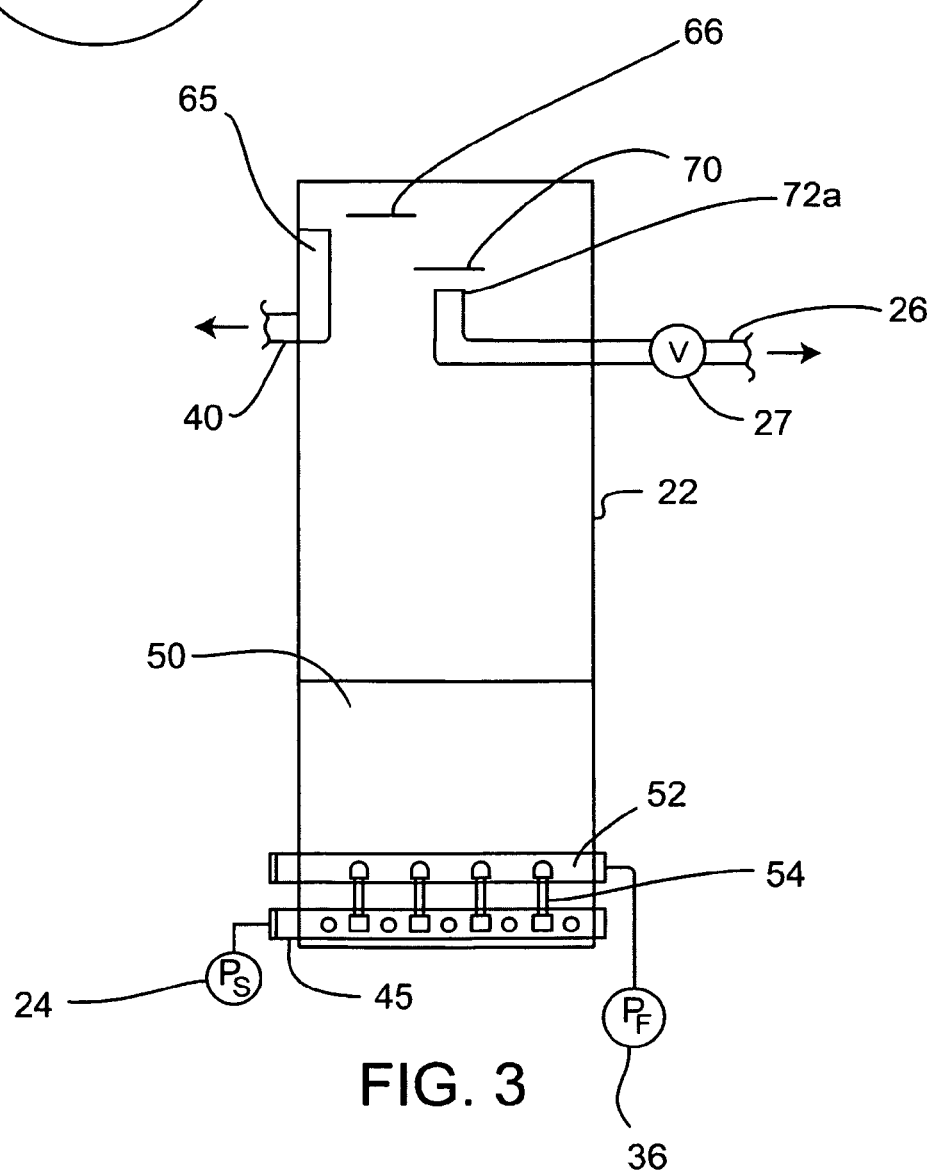
FIG. 3 is a more detailed schematic elevation view of the reactor vessel of the system.
Figure 4:
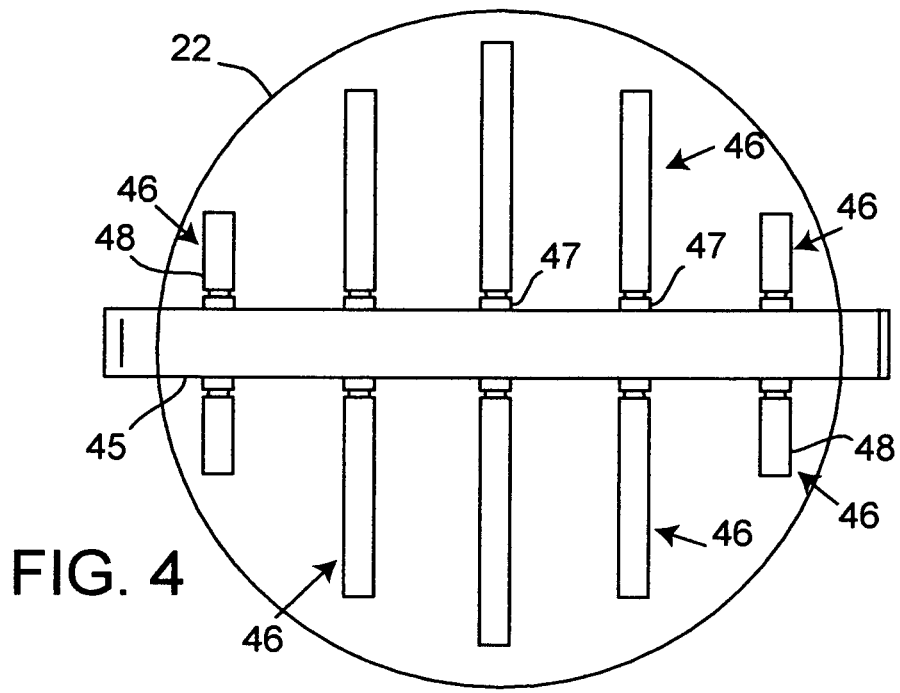
FIG. 4 is a plan view showing a layout of service flow diffusers in the reactor vessel.

The reactor 22 is shown in greater detail in FIGS. 3 and 3A, where the schematic views essentially show the reactor vessel in cross section, both elevation and top plan. FIG. 3 shows the service pump 24, also designated as $P_S$, directing the prefiltered and pH-adjusted pond water into the bottom of the tank via a header or manifold pipe 45 at the tank bottom. The header 45, preferably a stainless steel pipe of about 4 inch diameter, is shown in FIG. 4 as feeding a series of diffuser tubes 46 of various lengths in accordance with the circular shape of the reactor as indicated at 22. Couplings 47 secure the tubes 46 to the header. These diffusers evenly disperse the pond water around the area of the reactor. The diffuser tubes preferably are stainless steel pipe, e.g. ¾ inch 316 stainless steel pipe, although they could be epoxy coated carbon steel. These pipes are plugged at the ends and have diffuser holes, which may be about ⅛ inch diameter, essentially equally spaced on the diffuser pipes and numbering about 68 (about 60 to 75) in a reactor tank having an outside diameter of 44 inches, inside diameter slightly less (about 43½ inches). A range of diameter for practical purposes is about 3 feet to 6 feet. These pipes preferably are each encapsulated with a cylindrical screen 48 as indicated in FIG. 4. The screens help diffuse the pond water more evenly within the tank, and they prevent the reactor medium from clogging the delivery holes of the pipe. The screens are advantageously made of wedge wire, triangular in cross section, with slots facing inwardly toward the diffuser pipe. The screen slots may be about 0.005 inch wide, with the diffuser screen cylinder being approximately 2⅜ inch O.D. For example, these stainless steel screens may be made of wedge wire such as made by Johnson Screens (johnson-screens.com) and often used in water wells. The screens have their slits facing inwardly.

FIG. 3 indicates the reactor medium 50 in the tank 22, the medium extending through less than half the height of the tank, and typically only about ⅓ the height of the tank. Also shown in FIG. 3 is the fluff pump 36, feeding high-velocity fluff water to the tank via a header 52 spaced above the service header 45. As explained above, the fluff pump 36 is active when the service pump 24 is inactive, and vice versa. The fluff header 52 is spaced a short distance above the header 45, e.g. about 4 inches, with short drop pipes 54 that extend down to deliver fluff water at approximately the same level as the service delivery pipes, i.e. as close to the bottom of the reactor vessel as practicable.

Figure 6:
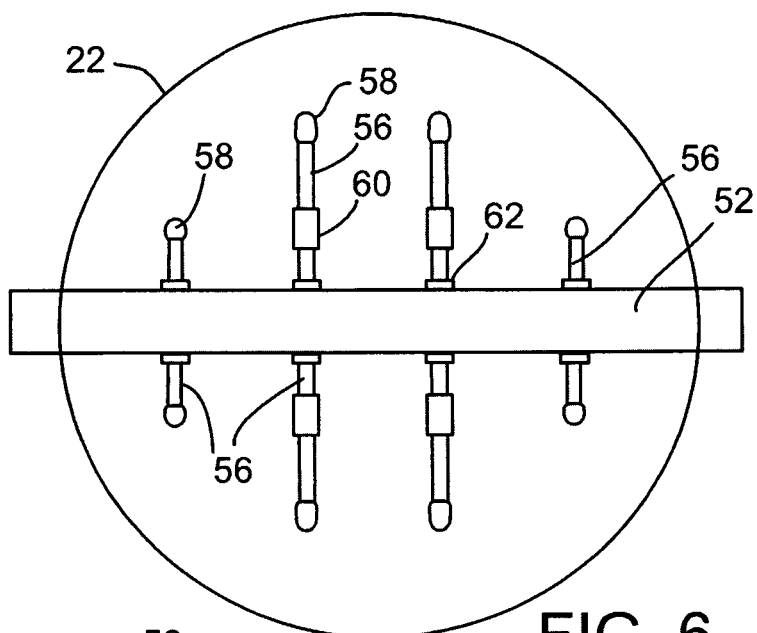
FIG. 6 is a plan view showing a layout of fluff flow nozzles.

FIG. 6 shows one preferred layout for the fluff water delivery system. The fluff header 52 can be a 4 inch pipe, to which are secured a series of laterals 56, with lengths that vary in accordance with the circular layout, as shown. There may be fewer of these than in the case of the service flow diffusers, as well as fewer and larger exit orifices, for delivery of the fluff flow which is approximately ten times or more the volumetric flow rate of the service flow.

Figure 5:
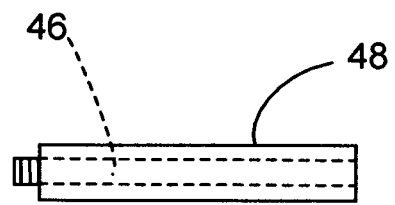
FIG. 5 is a detail view of a service flow diffuser.
Figure 7:
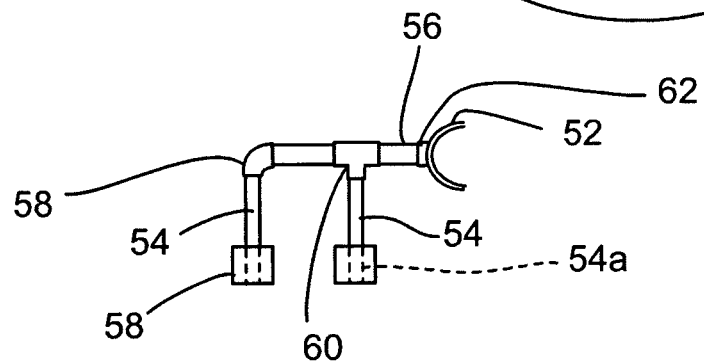
FIG. 7 is a detail view showing fluff nozzles.

As shown in FIGS. 6 and 7, the 4 inch header pipe 52 delivers the fluff flow via the laterals 56 down through the drop pipes 54 to fluff nozzles which, like the service nozzles, preferably are enclosed within cylindrical wedge wire screens 58. The drop pipe ends 54a enclosed within the screen preferably comprise, on each drop pipe, about four holes of about ⅜ inch diameter. Thus, in the layout shown in FIGS. 5 and 6 there are preferably about 48 holes. In a preferred embodiment the laterals 56 are 1½ inch pipe (preferably stainless steel), with the drop pipes preferably 1 inch pipe. Ells 58 and tees 60 are shown connecting the drop pipes to the lateral pipes 56, and these also are preferably stainless steel. Couplings are shown at 62 connecting the laterals to the 4 inch header pipe 52, also preferably of stainless steel. The couplings are welded onto the header.

The drop pipes 54 are of a length to place the high-flow fluff exit nozzles near the bottom of the reactor tank, and this may be in essentially the same level as the service flow diffusers as described above.

The headers 52 and 45 in one preferred embodiment extend through the walls of the reactor tank 22 as indicated in the drawings, and are welded to the walls in sealed relationship.

As noted above, the contact bed 50 of SMI medium is expanded greatly during the fluffing cycle, such that it occupies usually twice or more its normal volume in the tank. During the fluff cycle the fluffing water exits the tank via an overflow weir 65. Water level during fluff is indicated at 66 in FIG. 3, higher than service flow level. The water exits through a pipe 40, preferably a 6 inch pipe, which is the exit line schematically shown in FIG. 2, and this may return the fluff water to the detention pond.

In normal, service flow, the water level will be approximately at the indicated level 70 in FIG. 3, with the water exiting through a pipe 72, which can be a 3 inch pipe. This feeds the exit line 26 indicated in FIGS. 1 and 2, with the valve 27 in this line to be shut off during a fluff cycle. The pipe 72 has an input end 72a at a level high enough in the tank that the medium will not reach this level during a fluff cycle.

Chemical Reactions

As noted above, the SMI acts by adsorption. What appears to happen is that the selenate ion is pulled apart. The selenium of the selenate ion is believed to combine partly with the sulfur and partly with the iron and iron oxide (and possibly iron hydroxide) of the SMI; both selenium-sulfur and selenium-iron compounds exist in nature, usually together with other mineral elements and oxides. In fact, powdered iron alone has been used in the prior art to remove selenium, but as compared to the process with SMI, the use of powdered iron requires about ten to one hundred times more iron than does the SMI process. Also, many times more iron becomes dissolved in the treated water with the use of powdered iron rather than SMI.

The SMI in a reactor vessel is expected to remain active and effective for one year or more, when the reactor is operated at about 4-5 gallons per minute per square foot SMI. When the SMI has lost most of its effectiveness, it is replaced and the spent SMI can be melted down to retrieve the iron for re-use. Selenium content is minimal and can be discharged to a stack house filter on the stack of the steel mill.

Example 1

An Example of the Actual Operation of a Small Scale Reactor Adjacent to a Sediment Pond Below a Remediated Surface Mine Slope in Southern West Virginia A small scale SMI reactor was operated. It consisted of an 8 inch diameter 10 foot high steel pipe with a flanged bottom and an open top. A 6 inch long, 1½ inch diameter wedge wire pipe was placed inside the pipe at the bottom of the reactor perpendicular to the pipe wall to act as a diffuser for the influent pond water. Sulfur modified iron (SMI) was put into the pipe to a depth of 40 inches and water passed upflow through the SMI bed at a rate of 0.6 gallons per minute. The time of contact of water with the bed was approximately 14 minutes and the flow flux was about 2 gallons per minute per square foot.

The influent water was adjusted in a separate tank with sulfuric acid to reduce the inlet pH from 7.4 to a pH of 6.0 as the water entered the reactor. The effluent pH from the reactor tank was pH 7.6.

The selenate concentration in the pond was approximately 30 parts per billion and the selenate remaining in the water exiting the reactor was 0.05 parts per billion. There was no iron detected in the influent water and the iron concentration in the water at the outlet of the reactor was 39 parts per million (which in practice would be reduced to below 0.5 parts per million, as above).

The pilot was operated for approximately 30 days and at no time did the effluent water concentration of selenate from the reactor exceed 1 part per billion.

Figure 2:
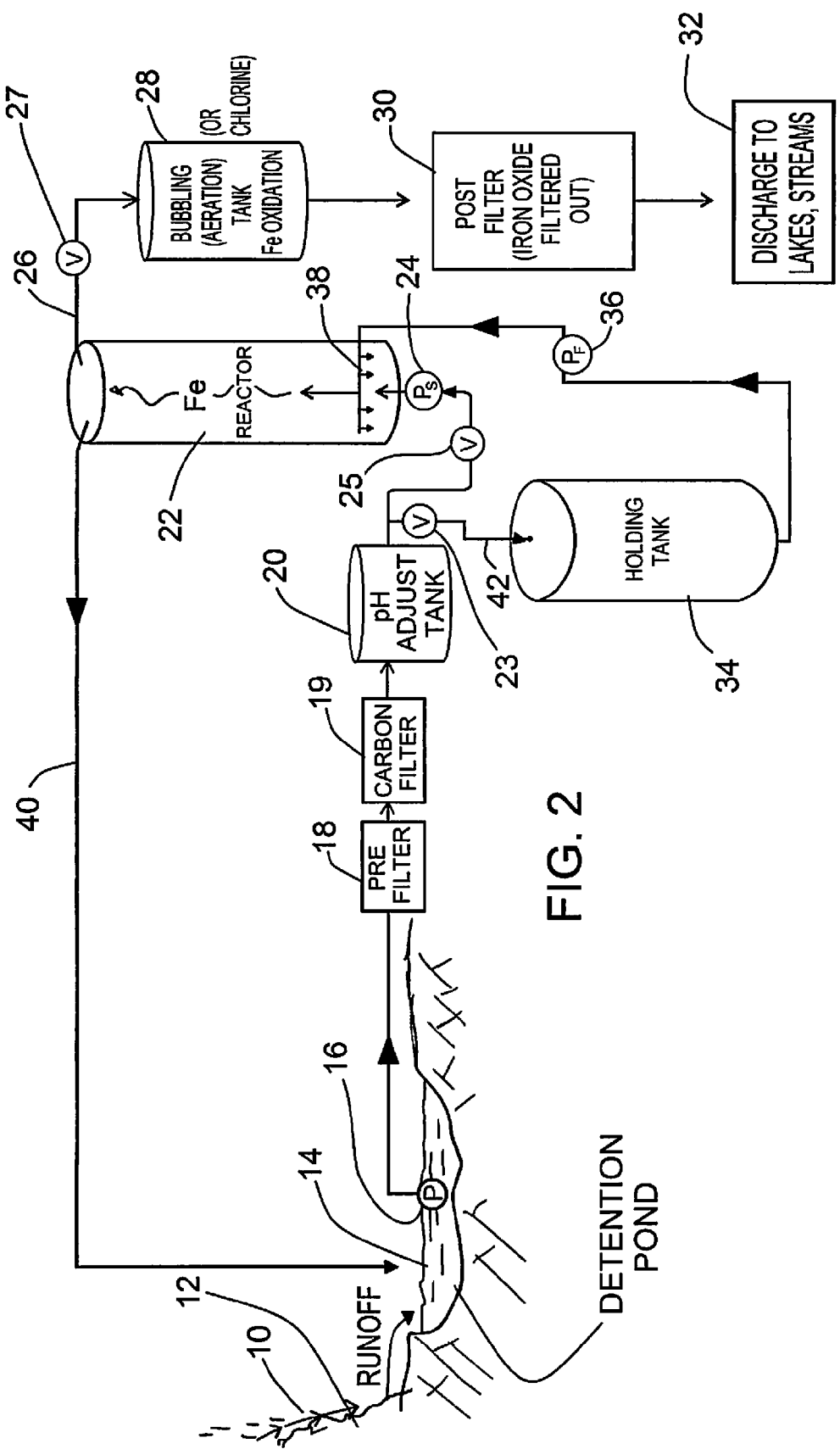
FIG. 2 is a similar view but showing a modified process.

In a second implementation of the invention, powdered iron is used rather than SMI, in essentially the same process. As noted above, powdered iron has been used previously to remove selenium, but not in the processes outlined above. FIG. 2 shows the modified process, with powdered iron used in the reactor rather than SMI. The other steps are similar, including the steps to remove iron oxide from the water post-reaction, and also including the fluff cycle for periodically loosening and extending the life of the contact bed.

In the iron reaction, as noted above, greater quantities of iron are consumed. The retention time in the reactor will be different, somewhat longer, estimated from 5 minutes to 30 minutes. Flow rate will be slower, in a range of about 1-5 gallons per minute per square foot.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for remediation of selenate content in runoff from overburden of surface coal mining, comprising:
   collecting rainwater runoff that has leached through rocks of the overburden, in at least one detention pond,
   withdrawing collected runoff water from the pond,
   prefiltering the withdrawn runoff water to remove particulate material,
   assuring pH of the prefiltered runoff water is within a range of about pH 5.0 to about pH 7.0, and adjusting pH of the runoff water when necessary,
   pumping the runoff water through a reactor column, in a vessel containing a contact bed of SMI which the runoff water contacts, thereby removing a significant portion of dissolved selenate from the runoff water, to produce a treated water, and
   further including periodically expanding and loosening the contact bed of SMI by fluffing the contact bed with a high-velocity upflow of water through the bed.

2. The method of claim 1, further including removing from the treated water iron which has been introduced into the water by contact with the SMI.

3. The method of claim 2, further including discharging the treated water, after iron removal, to a stream or lake.

4. The method of claim 1, further including discharging the treated water to a stream or lake.

5. The method of claim 2, wherein the iron removal step includes oxidation of the treated water to oxidize iron and form a precipitate, then a post-filtering step in which iron oxides are filtered out of the water.

6. The method of claim 1, wherein the prefiltering step includes filtering the runoff water with a sand filter followed by an activated carbon filter.

7. The method of claim 1, wherein the pH of the runoff water is adjusted to a range of about pH 6.0 to pH 6.5.

8. The method of claim 1, wherein in normal operation the runoff water is pumped through the reactor column in upflow direction, and when fluffing occurs normal operation is interrupted, and upflow of water through the contact bed is at about ten times or more normal flow rate.

9. The method of claim 1, wherein during fluffing the contact bed is expanded to twice or more its normal volume.

10. The method of claim 1, wherein the water used in fluffing is runoff water.

11. The method of claim 10, wherein the high velocity upflow of water during fluffing is delivered through nozzles separate from nozzles through which runoff water flows to the contact bed in normal operation.

12. The method of claim 1, wherein the step of periodically expanding and loosening the contact bed is performed at least once per day, for a duration of about ten to twenty minutes.

13. A system for removing selenium from surface runoff water from reclaimed land in a coal mining operation where overburden has rock containing selenium, comprising:
   at least one detention pond receiving such surface runoff, the detention pond being effective to settle out particulate and suspended matter from the runoff water,
   a treatment plant for removing selenium from the runoff water, with a pump delivering runoff from the detention pond to the treatment plant,
   the treatment plant including a prefilter for removing particulate material from the runoff water, a means for adjusting pH of the runoff water as necessary to place the acidity of the runoff water in a range of about pH 5.0 to pH 7.0, and a reactor column downstream of the pH adjustment means and receiving the runoff water, the reactor column comprising a vessel containing a contact bed of SMI for contact with the runoff water, and a pump for passing the runoff water through the reactor column in an upflow direction, the reactor column being effective to remove a significant portion of selenium contained in the runoff water to produce a treated water, and
   further including a fluff cycle loop including a runoff water holding tank, connected to receive runoff water from upstream of the reactor column and with a fluff pump connected to pump runoff water from the holding tank at high velocity up through the contact bed of the reactor column during a fluff cycle to expand and loosen the contact bed of SMI by fluffing the contact bed, the system including valving to interrupt normal operation of the reactor column during a fluff cycle.

14. The system of claim 13, wherein the treatment plant further includes an iron removal station for causing precipitation of iron from the treated water and for filtration of the precipitated iron from the water.

15. The system of claim 14, wherein the iron removal station includes means for oxidizing the treated water to form an iron oxide precipitate, and a filter for removing the iron oxide precipitate from the water.

16. The system of claim 13, wherein the means for adjusting acidity comprises means for assuring pH is in a range of about 5.5 to about 6.5.

17. The system of claim 13, wherein the means for adjusting acidity comprises means for assuring pH is in a range of about 6.0 to about 6.5.

18. The system of claim 13, wherein the prefilter includes a sand filter followed by an activated carbon filter.

19. The system of claim 13, wherein the fluff pump is of capacity to pump runoff water up through the contact bed at about ten times or more normal flow rate through the contact bed.

20. The system of claim 13, the reactor column including fluff nozzles in the vessel for delivery of water only during a fluff cycle.

21. The system of claim 13, wherein the fluff cycle loop includes means for delivering water from the fluff cycle, after passing through the contact bed, to the detention pond.

22. In a water treatment method for removing deleterious substances from water by passing the water through a reactor column in a vessel containing a contact bed of SMI which the water contacts in order to remove a significant portion of dissolved deleterious substances from the water, a method for loosening and opening the contact bed to prevent or break up compacting of SMI medium, expanding and loosening the bed of SMI, by periodically fluffing the contact bed with a high-velocity upflow of water through the bed.

* * * * *